United States Patent
Cao et al.

(10) Patent No.: US 11,671,878 B2
(45) Date of Patent: *Jun. 6, 2023

(54) OPTIMIZED TRAIN SOLUTION

(71) Applicant: Parallel Wireless, Inc., Nashua, NH (US)

(72) Inventors: Yang Cao, Westford, MA (US); Jitender Arora, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/115,030

(22) Filed: Dec. 8, 2020

(65) Prior Publication Data

US 2021/0092649 A1  Mar. 25, 2021

Related U.S. Application Data

(63) Continuation of application No. 16/298,562, filed on Mar. 11, 2019, now Pat. No. 10,863,391, which is a (Continued)

(51) Int. Cl.
*H04W 36/00* (2009.01)
*H04W 76/12* (2018.01)
(Continued)

(52) U.S. Cl.
CPC ... *H04W 36/0016* (2013.01); *H04W 36/0022* (2013.01); *H04W 76/12* (2018.02); (Continued)

(58) Field of Classification Search
CPC ............ H04W 76/12; H04W 36/0022; H04W 36/0016; H04W 84/005; H04W 36/14; H04W 36/0044; H04W 36/0038
See application file for complete search history.

(56) References Cited

U.S. PATENT DOCUMENTS 9,949,309 B2 * 4/2018 Carroll ............... H04W 76/15
2014/0146749 A1 * 5/2014 Barker ............... H04W 40/026
370/328

(Continued)

*Primary Examiner* — Brian D Nguyen
(74) *Attorney, Agent, or Firm* — Michael Y. Saji; David W. Rouille

(57) ABSTRACT

The use of wireless backhaul poses special challenges for in-vehicle base stations. Users that are connected to an in-vehicle base station expect continuous service, even as the in-vehicle base station passes in and out of different wireless backhaul coverage zones, such as when a train passes from a train station with good coverage to a tunnel with poor coverage. The base station thus needs seamless backhaul handover. A system that enables an in-vehicle base station to receive continuous service across different backhaul coverage zones is needed. To solve this problem, a system enabling handover is described. The system involves double-tunneling mobile device data packets in an ESP-UDP IPsec tunnel encapsulated in a GTP-U tunnel. Traffic is transmitted from a mobile device to a specially configured base station that encapsulates mobile device data packets and sends them to the network via wireless backhaul using an LTE UE modem connection.

18 Claims, 12 Drawing Sheets

Related U.S. Application Data continuation of application No. 15/686,152, filed on Aug. 24, 2017, now Pat. No. 10,231,151.

(60) Provisional application No. 62/379,058, filed on Aug. 24, 2016.

(51) Int. Cl.
  *H04W 36/14* (2009.01)
  *H04W 84/00* (2009.01)

(52) U.S. Cl.
  CPC .... *H04W 36/0038* (2013.01); *H04W 36/0044* (2013.01); *H04W 36/14* (2013.01); *H04W 84/005* (2013.01)

(56) References Cited

U.S. PATENT DOCUMENTS

| | | | |
|---|---|---|---|
| 2014/0153789 A1* | 6/2014 | Sharma | G09B 29/106 382/113 |
| 2015/0146734 A1* | 5/2015 | Haney | H04L 47/726 370/392 |
| 2015/0188949 A1* | 7/2015 | Mahaffey | H04L 63/0272 726/1 |
| 2016/0234039 A1* | 8/2016 | Ng | H04L 43/0882 |
| 2018/0013583 A1* | 1/2018 | Rubenstein | H04L 63/02 |

* cited by examiner

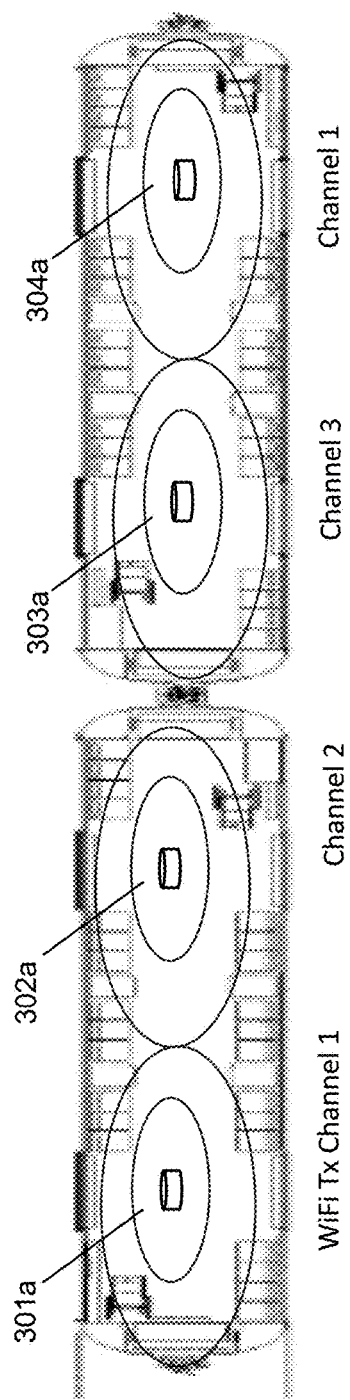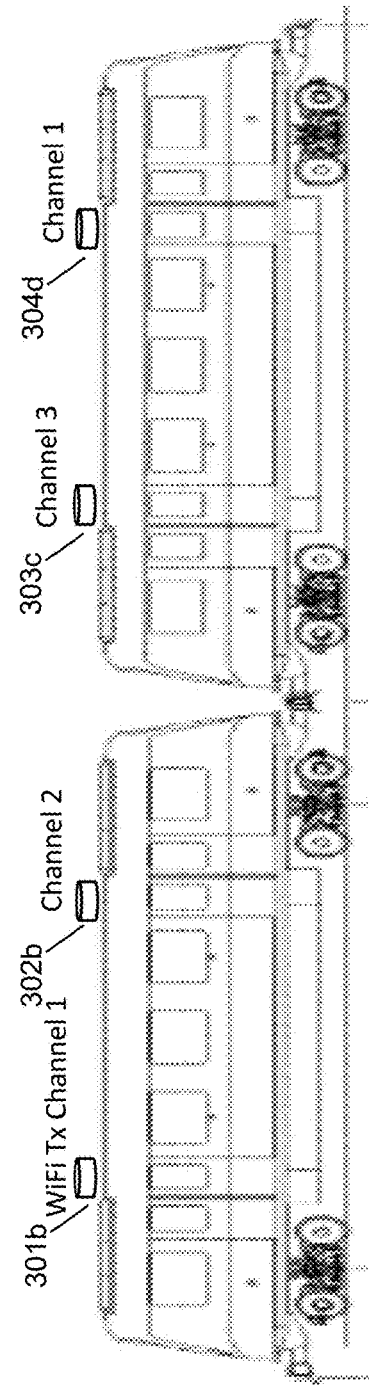
FIG. 3A
FIG. 3B

OPTIMIZED TRAIN SOLUTION

CROSS-REFERENCE TO RELATED APPLICATIONS

This application is a continuation of, and claims the benefit under 35 U.S.C. § 120 of, U.S. patent application Ser. No. 15/298,562, filed Mar. 11, 2019, issued as U.S. Pat. No. 10,863,391 and entitled "Optimized Train Solution," which claims the benefit under 35 U.S.C. § 120 of, U.S. patent application Ser. No. 15/686,152, filed Aug. 24, 2017 issued as U.S. Pat. No. 10,231,151 and entitled "Optimized Train Solution," which claims the benefit of priority under 35 U.S.C. § 119(e) to U.S. Provisional Patent Application No. 62/379,058, filed on Aug. 24, 2016 and having the title "Optimized Train Solution," each of which are hereby incorporated by reference in its entirety for all purposes. In addition, this application hereby incorporates by reference U.S. patent application Ser. No. 13/889,631 (PWS-71700US01), U.S. patent application Ser. No. 14/024,717 (PWS-71700US02), U.S. patent application Ser. No. 14/183,176 (PWS-71710US01), and U.S. patent application Ser. No. 15/202,496 (PWS-71726US01), and U.S. Pat. Nos. 9,113,352 and 9,491,801, and U.S. Pat. Pub. No. 20150257051, in their entirety for all purposes.

BACKGROUND

Wireless access is provided to user equipments (UEs) or other mobile devices by cellular base stations. Each cellular base station also needs backhaul, with sufficient capacity to meet the needs of every connected user simultaneously. Although backhaul is typically provided using a wired connection to the Internet or to a private operator network, in some cases backhaul is provided using a wireless connection. Wireless backhaul can be provided over a Wi-Fi connection, thus avoiding interference with the bands used for cellular access.

Wireless access is also provided to users within subways and trains, as well as other vehicles. However, providing access with the quality that users have come to expect requires expensive buildout of coverage within subterranean tunnels, and improving coverage only at train stations does not solve this problem.

SUMMARY

A system for providing wireless access within a vehicle is disclosed, comprising: an in-vehicle base station for providing access to mobile devices, the in-vehicle base station connected to an operator core network via a first and a second wireless backhaul connection. The first wireless backhaul connection may be a lower-bandwidth mobile wireless backhaul connection and the second wireless backhaul connection may be a higher-bandwidth wireless backhaul connection; and a coordinating node coupled to the in-vehicle base station via the first and the second wireless backhaul connection; wherein mobile device data packets may be double encapsulated into a first data tunnel and a second data tunnel to be sent over the first wireless backhaul connection, and wherein a source network address of the first data tunnel may be translated at the in-vehicle base station to an address assigned to the in-vehicle base station by a first mobility anchor node in a core network of the first wireless backhaul connection, thereby enabling mobile device handover between the first wireless backhaul connection and the second wireless backhaul connection. The method may further comprise an ePDG located at the coordinating node, a Wi-Fi UE, and an additional IPsec tunnel between the Wi-Fi UE and the ePDG. The endpoints of the first data tunnel may be the in-vehicle base station and the first mobility anchor node, and the endpoints of the second data tunnel may be the in-vehicle base station and the coordinating node. Mobile device data packets may be encapsulated into a third data tunnel to be sent over the second wireless backhaul connection, and where the endpoints of the third data tunnel may be the in-vehicle base station and the coordinating node. The source network address of the first data tunnel may be translated to a network address of the in-vehicle base station assigned by the first mobility anchor node of the in-vehicle base station for the lower-bandwidth mobile wireless backhaul connection. At least one mobile device of the mobile devices may be a UE, and the UE may be anchored to a second mobility anchor node, the second mobility anchor node being a packet data network gateway (PGW), the second mobility anchor node being accessed via the coordinating node as a gateway. The second mobility anchor node may be the first mobility anchor node.

The in-vehicle base station may be configured to permit handover of the first wireless backhaul connection from a first eNB to a second eNB. The in-vehicle base station may be configured to permit handover from the first wireless backhaul connection to the second wireless backhaul connection. The lower-bandwidth wireless backhaul connection may be an LTE UE connection via an LTE macro eNodeB to an LTE core network, and the in-vehicle base station may be assigned an IP address via a packet data network gateway (PGW) acting as a mobility anchor node in the LTE core network. The source network address of the first data tunnel may be translated to the PGW-assigned in-vehicle base station IP address. The first and the second data tunnels may be an ESP-UDP IPsec tunnel and a GTP-U tunnel. The second wireless backhaul connection may be via a base station with Ethernet or fiber wired backhaul. The method may further comprise a plurality of in-vehicle base stations configured to provide Wi-Fi access inside the vehicle on a plurality of channels. The vehicle may be a train, a subway, a plane, a boat, a ship, a bus, or a drone.

The coordinating node may be configured to check an international mobile subscriber identity (IMSI) of a mobile device to determine whether an IP address should be preserved, and configuring the in-vehicle base station for encapsulation. The method may further comprise a train. The in-vehicle base station may be configured to use the second wireless backhaul connection when within range, the second wireless backhaul connection providing access from a location in a train station. Multiple Wi-Fi access points may be mounted within a plurality of train cars. The multiple Wi-Fi access points may be configured to form a single mesh network, and the multiple Wi-Fi access points may be configured to share access to the second wireless backhaul connection when one or more of the Wi-Fi access points may be within range of the second wireless backhaul connection. The in-vehicle base station may be configured to permit handin and handout of Wi-Fi devices to and from other Wi-Fi networks via an evolved packet data gateway (ePDG) functionality at the coordinating node. The in-vehicle base station may be configured to permit handin and handout of LTE UE devices to and from other cells.

BRIEF DESCRIPTION OF THE DRAWINGS

FIG. 3A is a further schematic diagram of a wireless network showing antennas and signal coverage within a train, in accordance with some embodiments.

FIG. 3B is a further schematic diagram of a wireless network showing antennas and signal coverage within a train, in accordance with some embodiments.

DETAILED DESCRIPTION

Figure 1:
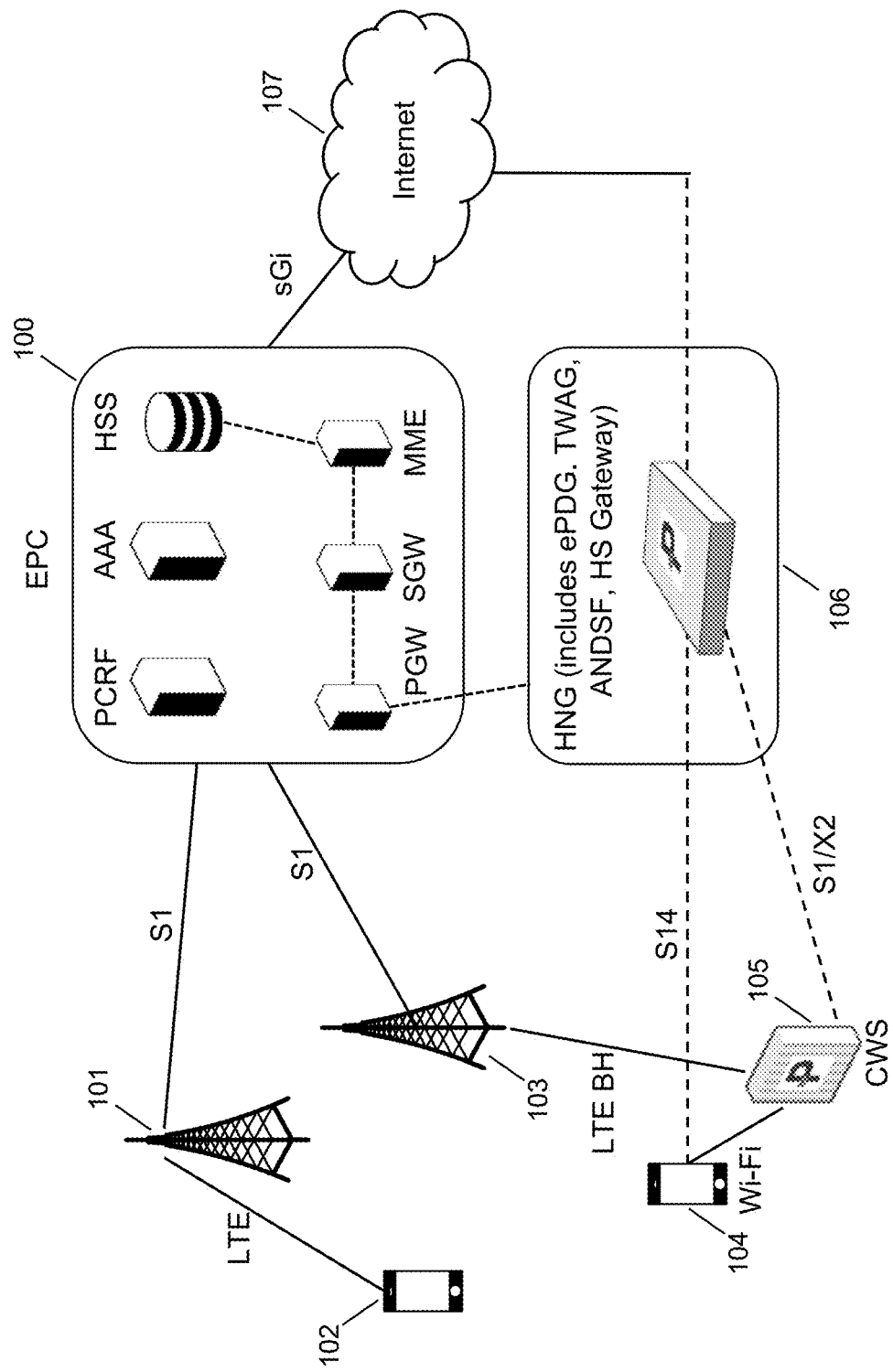
FIG. 1 is a schematic diagram of a wireless network architecture, in accordance with some embodiments.

The use of wireless backhaul poses special challenges for in-vehicle base stations. Users that are connected to an in-vehicle base station expect continuous service, even as the in-vehicle base station passes in and out of different wireless backhaul coverage zones, such as when a train passes from a train station with good coverage to a tunnel with poor coverage. The base station thus needs seamless backhaul handover. This is similar to the need for seamless handover for mobile devices. A system that enables an in-vehicle base station to receive continuous service across different backhaul coverage zones is needed.

To solve this problem, a system enabling handover is described. The system involves double-tunneling mobile device data packets in an ESP-UDP IPsec tunnel encapsulated in a GTP-U tunnel. Traffic is transmitted from a mobile device to a specially configured base station. The specially configured base station encapsulates mobile device data packets and sends them to the network via wireless backhaul using an LTE UE modem connection.

Disruption of an IP connection occurs when an endpoint has an IP address change. A combination of network address translation, multihoming, and tunneling may be used to insulate UEs and reduce any negative impact of a backhaul change.

In some embodiments, access may be provided using Wi-Fi. In some embodiments, access may be provided using one or more wireless access media, including 2G, 3G, 4G, 5G, or other wireless media. The access provided to UEs is dependent only on the access technology supported by the in-vehicle base station, not the backhaul solution supported thereby.

In some embodiments, a train may be provided with a plurality of base stations. Two base stations may be mounted in each car. The base stations may provide access using Wi-Fi. The Wi-Fi channels used by the base stations may be non-contiguous, such that each base station transmits with a minimum of interference within its designated range. Each base station may provide power output appropriate to provide access coverage to half of the vehicle car. The base stations may each be connected to its own antenna mounted on the exterior of the vehicle. The externally-mounted antennas may provide global positioning service (GPS) capability. The externally-mounted antennas may provide LTE capability, such that they connect to LTE macro base stations located outside.

In some embodiments, the base stations mounted in the vehicle may be connected using a mesh network, either via a wired or wireless mesh network. If the network is a wireless mesh network, such as a Wi-Fi network, a different frequency may be selected for mesh networking than the wireless access provided to UEs.

In some embodiments, switchable backhaul may be provided. In environments where multiple backhaul options exist, the mesh network within the vehicle may determine that one backhaul network is preferred over another backhaul network. Backhaul may be handed over from one backhaul to the other backhaul without disruption of service using the method described within. As the IPsec tunnel continues to provide signal continuity while the outermost tunnel (GTP-U or another tunnel) is changed, UEs do not experience a disruption of service.

In some embodiments, a handover may result in a significant increase in backhaul bandwidth, leading to a step function difference in bandwidth when a Parallel Wireless CWS base station makes contact with the station, e.g., 50 Mbps to 200 Mbps, in a short period of time. This increase may be the result of a single CWS obtaining additional bandwidth, even for a mesh network consisting of several CWSes.

In some embodiments, subsequent to a single CWS being handed over when it enters into range of a train station's wireless coverage area, when the train fully pulls into the station, each train CWS may speak to its own station CWS, increasing bandwidth many times over.

In some embodiments, these changes to the mesh may resolve quickly, with single-digit millisecond routing settling with mesh.

The double tunneling method described herein is fully transparent to UE because of the use of network address translation (NAT) at CWS, and the use of double tunneling (IPsec encapsulated in GTP tunnel).

Sessions may be anchored at HNG (with their IP addresses maintained at the HNG and mobility tracked by the HNG). Note that there are two PGWs, because UE is anchored at PGW on other side of HNG and CWS-UE is anchored at PGW on this side of HNG.

In an alternate method, multihoming may be used at the CWS, for switchable backhaul. Both backhaul connections anchored at same PGW. Either method can be used with any access at UE.

In some embodiments, the CWS may act as a Hotspot 2.0 client or ePDG client on behalf of multiple UE's. In some embodiments, multiple CWSes are handed over by a single CWS performing a handover. The handover is transparent to all UEs.

FIG. 1 is a schematic diagram of a wireless network architecture, in accordance with some embodiments. A conventional mobile network is shown, including Long Term Evolution (LTE) macro eNodeBs 101 and 103, LTE UE 102, evolved packet core (EPC) 100, and Internet 107. EPC 100 includes a policy, charging and rules function (PCRF), an authorization, authentication and accounting (AAA) node, a home subscriber server (HSS), a packet data network gateway node (PGW), a serving data network gateway node (SGW), and a mobility management entity (MME). In addition, a Wi-Fi UE 104 is shown, which connects to Wi-Fi access point 105 for Wi-Fi access, and which connects via an S14 interface to an ePDG 106. Wi-Fi AP 105 is labeled "CWS" and can be an enhanced eNodeB/Wi-Fi multi-RAT node, in some embodiments, such as the Parallel Wireless Converged Wireless System (CWS)™. ePDG 106 includes additional elements, such as a trusted wireless access gateway (TWAG), ANDSF, HS Gateway, etc. and is labeled "HNG"; this node can be a Parallel Wireless HetNet Gateway™, in some embodiments. The HNG sits between a wireless radio access network (RAN) and its core network. For more details about the HNG the reader is referred to U.S. Pat. Pub. No. 20150257051, hereby incorporated by reference for all purposes.

The Wi-Fi UE 104 is attached to the CWS 105, which is coupled through LTE backhaul to core network 103, 100, and via core network 100 and Internet 107 to HNG 106. HNG 106 provides coordination of CWS 105 via a point-to-point connection; specifically, an IPsec tunnel is formed between 105 and 106 to permit transfer of signaling and data. This tunnel prevents EPC 100 from being able to read or alter the data, even as the data moves through the core network. For more details about the LTE backhaul connection the reader is referred to U.S. patent application Ser. No. 15/202,496, issued as U.S. Pat. No. 9,386,480, hereby incorporated by reference in its entirety. It is noted that CWS 105 includes a physical UE card coupled electrically to the CWS as a module, with its own subscriber identity module (SIM) card, used to connect to macro base station 103.

Figure 2:
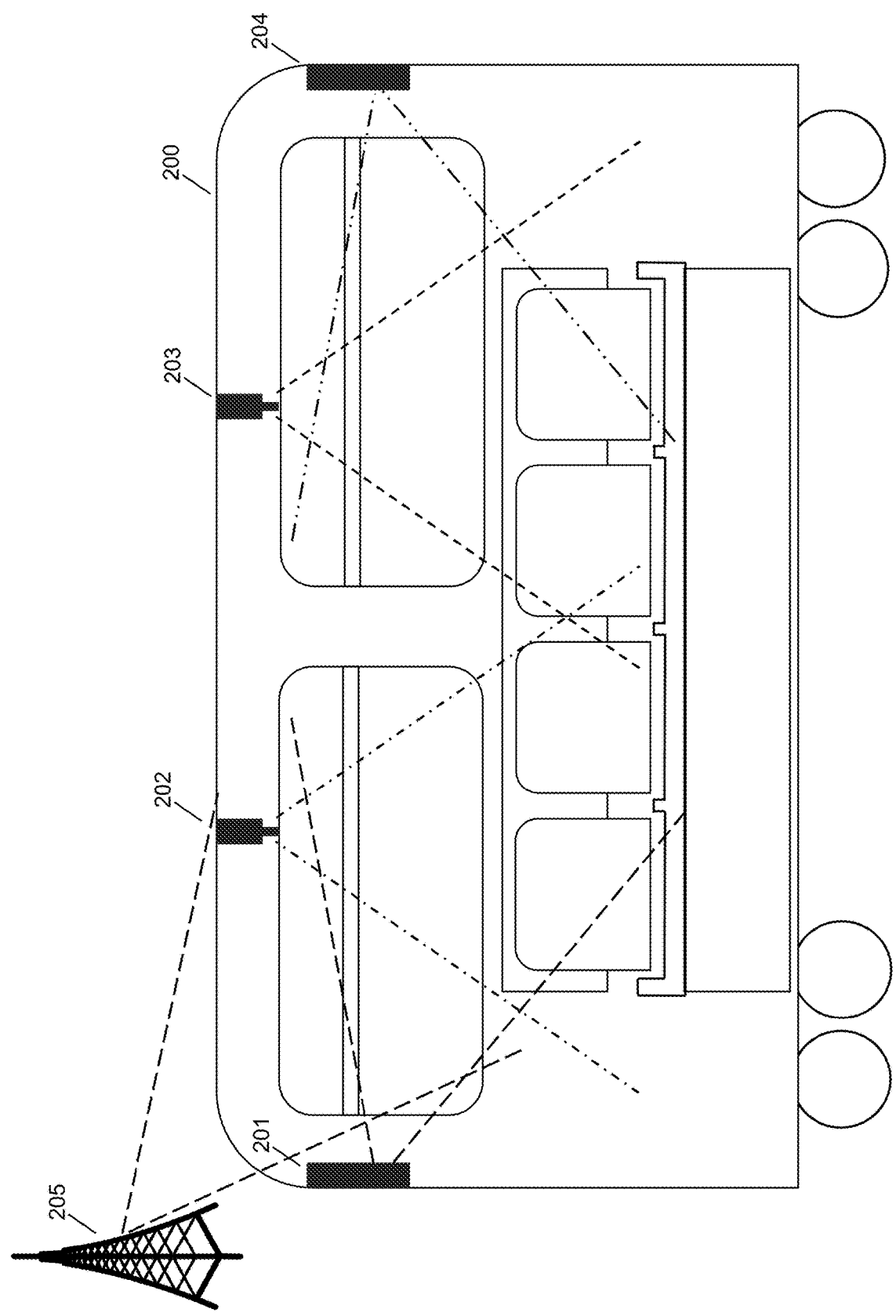
FIG. 2 is a schematic diagram of a wireless network showing antennas and signal coverage within a train, in accordance with some embodiments.

FIG. 2 is a schematic diagram of a wireless network showing antennas and signal coverage within a train, in accordance with some embodiments. Train car 200 is shown having antennas 201, 202, 203, 204 for providing access to devices on the train. In some embodiments the access networks can be Wi-Fi networks or LTE networks or another type of network. In some embodiments, a subset of these antennas may be present, or additional antennas. In some embodiments antennas 201 and 204 are patch directional antennas, installed on either end of the coach to cover passengers in the coach. Antennas 201 and 204 are configured to not interfere with each other, with different transmitting channels and with coverage limited to the footprint of each particular AP. In some embodiments omnidirectional antennas 202 and 203 can be mounted on the roof of the train car to provide access to devices on the train, with different transmitting signals and with different transmit power. The antennas may be connected to a CWS or multi-RAT base station/access point (not shown) Macro base station 205 may provide LTE backhaul to the train car. LTE is well-designed to support high-speed mobility and is well-suited for backhaul in this case. Multiple train cars may be equipped with their own base stations, access points, and antennas to provide service in all cars.

FIG. 3A is a further schematic diagram of a wireless network showing antennas and signal coverage within a train, from a top-down view of the train, in accordance with some embodiments. Wi-Fi access networks 301a and 302a are shown in the first train car on Wi-Fi channels 1 and 2, respectively. Wi-Fi access networks 303a and 304a are shown in the second train car on Wi-Fi channels 3 and 1, respectively, such that no channel is reused in two adjacent access networks and no AP in proximity transmits on the same channel. 5 GHz or 2.4 GHz or another Wi-Fi band could be used. SG and SGx coverage could be provided.

FIG. 3B is a further schematic diagram of a wireless network showing antennas and signal coverage within a train, in accordance with some embodiments, from a side view of the train. Wi-Fi access networks 301b and 302b are shown in the first train car. Wi-Fi access networks 303b and 304b are shown in the second train car. The access networks are the same networks shown in the top-down view in FIG. 3A. The antennas are shown mounted on the roof of the train cars using omnidirectional antennas.

Figure 4:
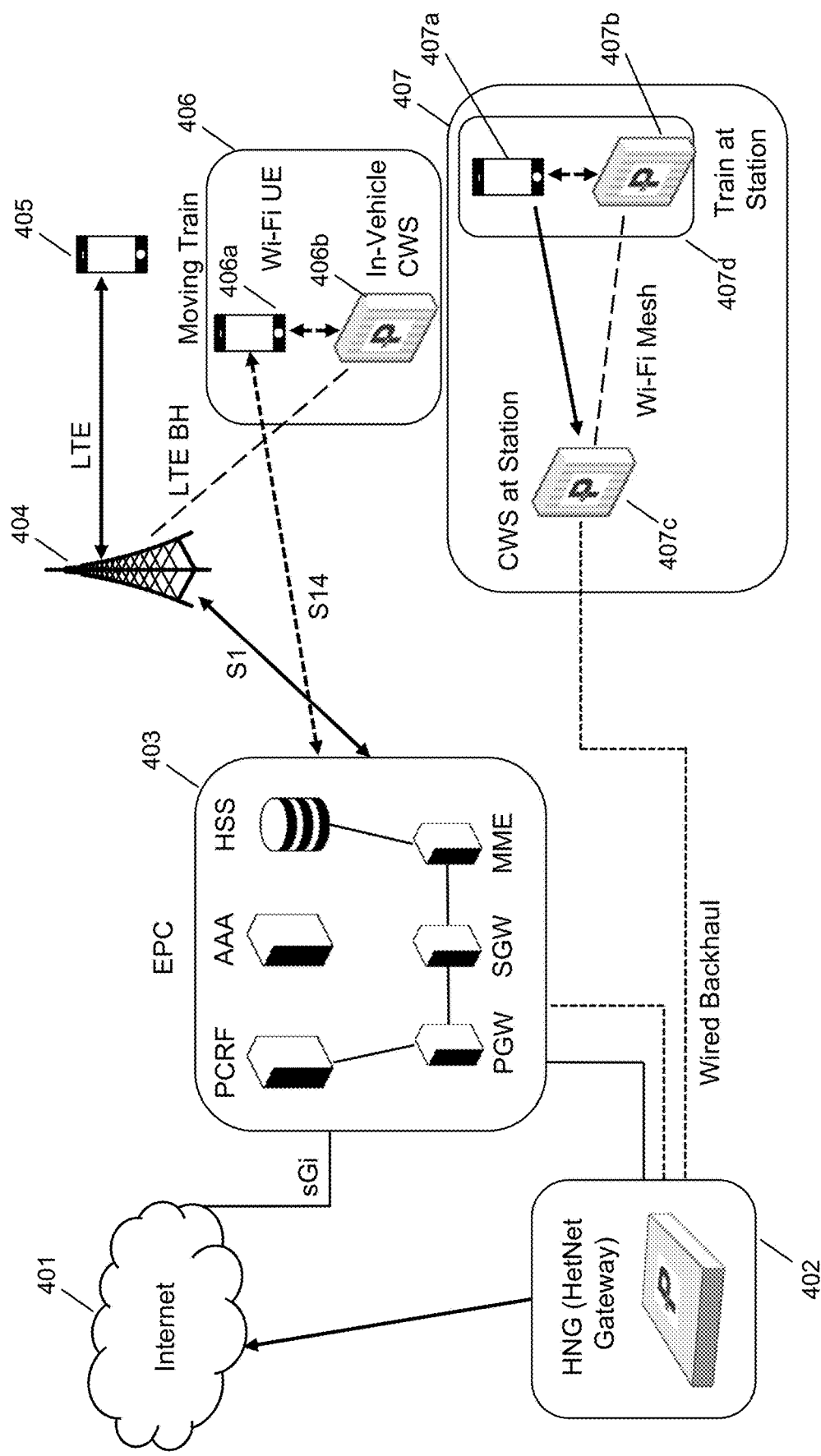
FIG. 4 is a schematic diagram of a wireless network architecture for trains and train stations, in accordance with some embodiments.

FIG. 4 is a schematic diagram of a wireless network architecture for trains and train stations, in accordance with some embodiments. A wireless network architecture includes Internet 401, EPC 403, HNG 402, and macro base station 404. UE 405 is attached to macro base station 404. Moving train 406, train station 407, and train at station 407d are also shown. Moving train 406 includes Wi-Fi UE 406a attached to in-vehicle access point/multi-RAT base station 406b. Train station 407 includes a train at the station 407d, as well as an access point/base station 407c. A Wi-Fi UE 407a and an in-vehicle access point/multi-RAT base station 407b are also provided. Gateway 402 is acting as an ePDG/TWAG, ANDSF, and a hotspot gateway.

In some embodiments, the access point/base station described herein and referred to as a CWS may be a multi-RAT base station with Wi-Fi and LTE access capability; integrated flexible backhaul including line of sight (LOS) and non-line of sight, fiber, Ethernet, and LTE backhaul; multi-radio multipoint-to-multipoint wireless mesh capability; control, security and traffic prioritization capability; self-organizing network (SON)-based interference mitigation for superior subscriber experience and dynamic RF power adjustments, as described in U.S. Pat. No. 9,113,352, hereby incorporated by reference in its entirety; weather-sealed and heat-resistant, heat-dissipative hardware; a mobility manager to provide mobility across LTE and mesh backhaul links, as described herein; and Hotspot 2.0 client intelligent for LTE and mesh backhaul mobility.

In some embodiments a higher quality of service channel indicator (QCI) could be configured for the LTE backhaul, for voice traffic over the LTE backhaul, and/or other QCI/QoS parameters.

LTE backhaul handovers can be coordinated between macro base stations to ensure coverage of the train, in some embodiments, in situations where the train handover patterns are well known, for example, if a train has a known route.

Figure 5:
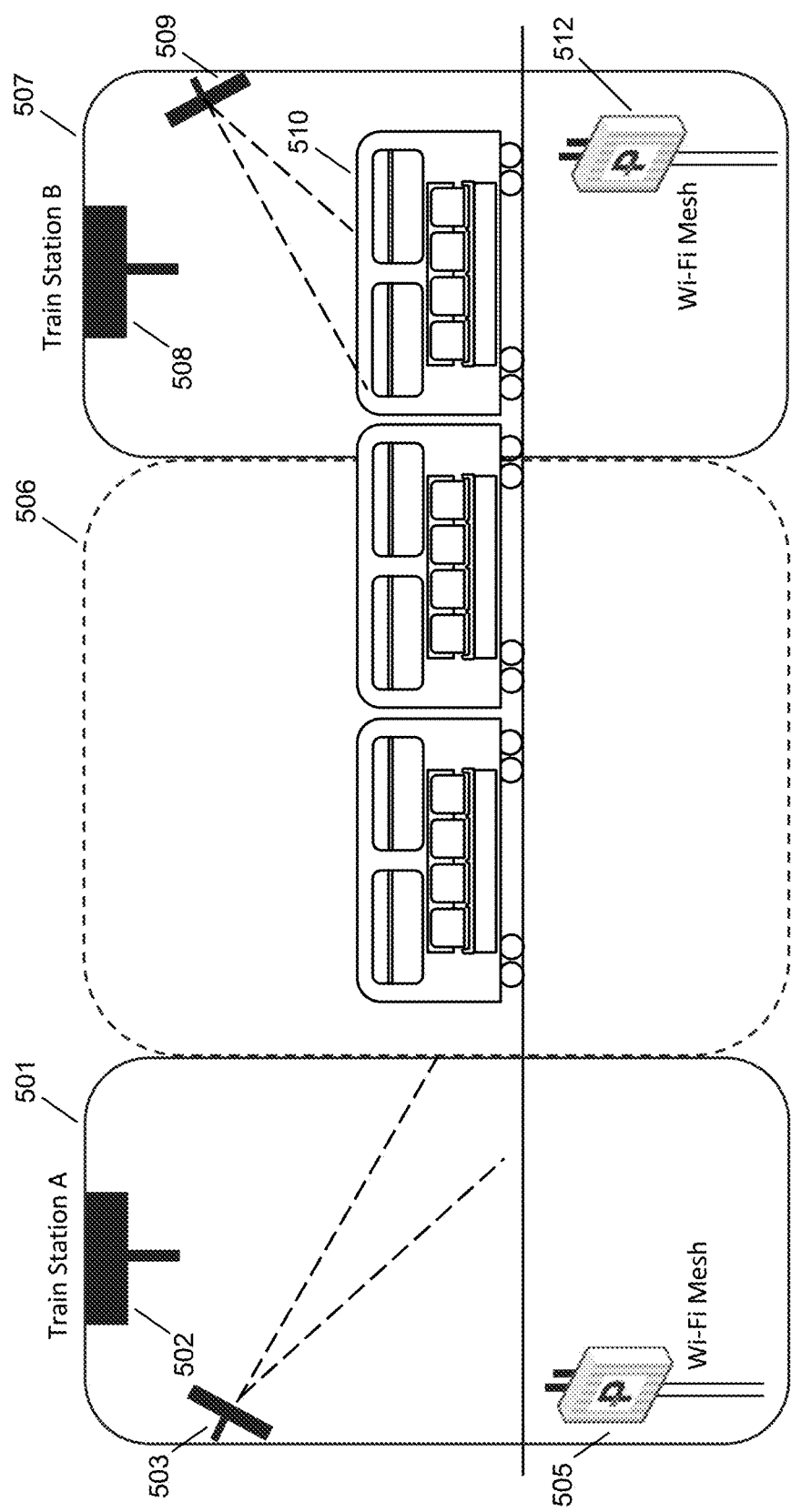
FIG. 5 is a schematic diagram of a wireless network showing wireless coverage of a train with relation to train stations, in accordance with some embodiments.

FIG. 5 is a schematic diagram of a wireless network showing wireless coverage of a train with relation to train stations, in accordance with some embodiments. Train 510 is moving from train station A 501 to train station B 507 along a track. The area 506 between train stations has poor coverage.

Train station A 501 has a ceiling-mounted multi-RAT base station 502, providing access network coverage to users within the train station, and a directional antenna and base station 503, providing coverage into a small fraction of area 506. Train station A 501 also has mesh base station 505, providing coverage within the train station area. Train station B 507 has a similar set of base stations, including ceiling-mounted multi-RAT base station 508, providing access network coverage to users within the train station, and a directional antenna and base station 509, and mesh base station 512. It is known in the prior art to, for example, have Wi-Fi access points throughout a train station, but the prior art implementation is improved upon in the present disclosure at least as follows.

Train 510 includes a mesh network. As train 510 moves between train stations, each train car moves out of coverage for certain access networks and into coverage for other access networks. In the diagram, the first train car is able to make a connection with antennas 508, 509 and mesh network 512 when it pulls into train station B. As the train cars are linked in a mesh network, the other train cars are able to immediately utilize the coverage available at train station B throughout the train, enabling a relatively short period of limited connectivity while train cars transit through area 506. The bandwidth available through the train station network is also higher bandwidth, enabling more and better connectivity within the train once the train mesh network joins the train station network. When the train pulls into the station, the train station may have multiple base stations, each with wired backhaul. Each train-mounted base station may connect to its own wired backhaul equipped base station to create a mesh backhaul network with many wired egress nodes, to immediately make a large amount of bandwidth available for use by the train. When transiting through or entering into a train station with a plurality of mesh nodes, the mesh nodes in the train may connect to the mesh nodes in the station one by one, dynamically increasing the available egress bandwidth.

The present disclosure is intended to provide similar support for other moving vehicles, drones, planes, buses, aboveground light rail, etc. As well, the present disclosure provides support for non-vehicle uses, for example, providing flexible backhaul capabilities in a rural area using a mesh backhaul network with multiple nodes, or flexible backhaul capabilities in a semi-isolated access network with limited backhaul, or any use of this network address translation (NAT) plus tunneling architecture with ePDG, or TWAG, or satellite backhaul, or space-based or other network systems with limited or high-latency backhaul.

This is helpful, in some embodiments, as LTE resources for backhaul would be freed up by leveraging Wi-Fi access at the station. Underground stations may not be able to provide LTE backhaul, but may be able to provide wired or Wi-Fi backhaul. Using some conservative assumptions, such as 12 base stations on a train, each carrying 60 Mbps of traffic, and 4 minutes of mesh backhaul per stop (2 minutes while train is stopped at station, along with 1 minute before stopping and 1 minute after leaving), a savings of 720 Mbps times 240 seconds, or 168 gigabits per train stop, of LTE backhaul bandwidth could be obtained.

Figure 6:
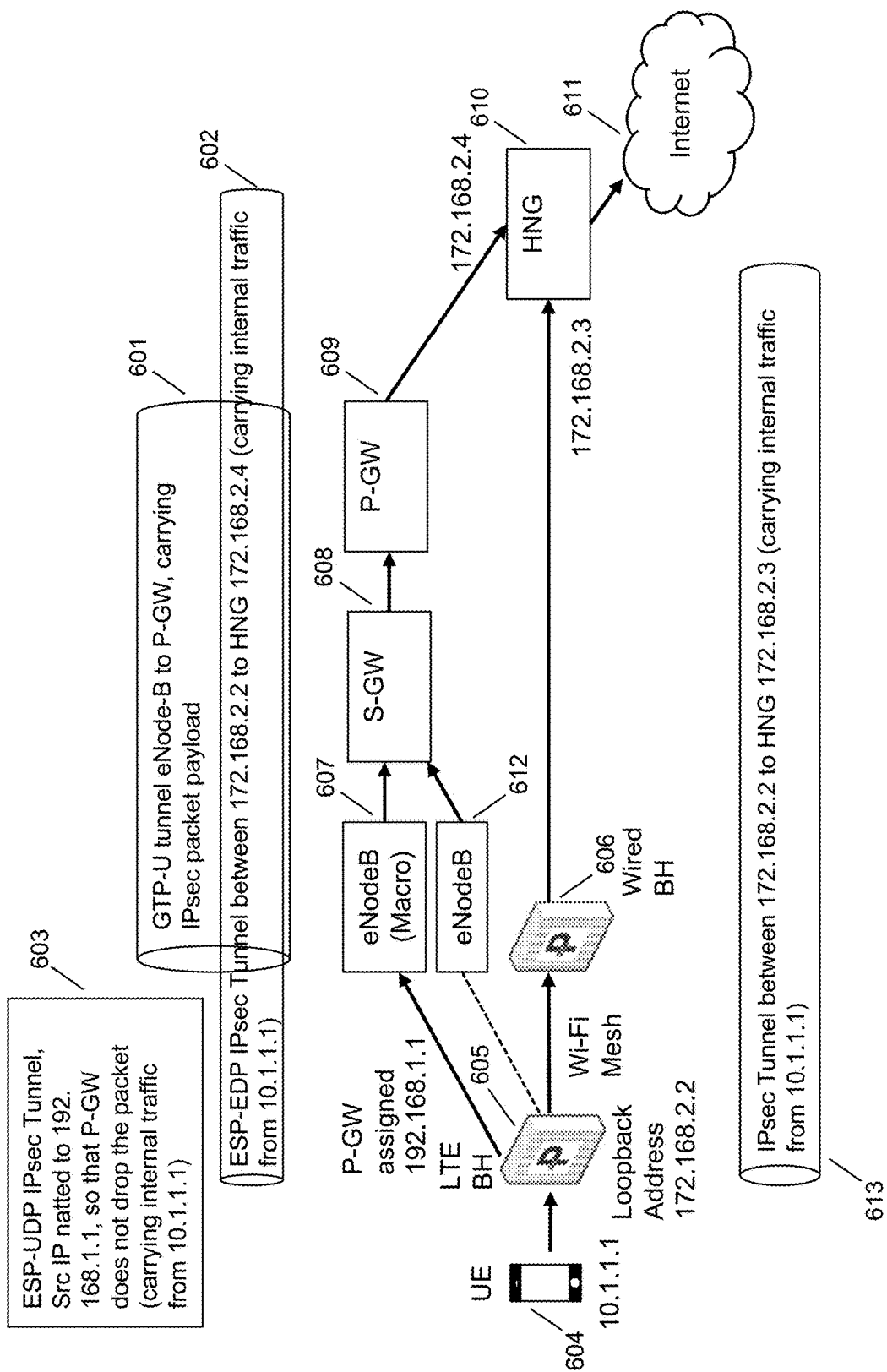
FIG. 6 is a schematic diagram of a wireless network showing tunneling and network address translation for a mobile device, in accordance with some embodiments.

FIG. 6 is a schematic diagram of a wireless network showing tunneling and network address translation for a mobile device, in accordance with some embodiments. UE 604, with IP address 10.1.1.1 assigned by its PGW in the operator network (not shown), is attached to base station 605. Base station 605 is a multi-RAT base station/CWS as described herein, with two backhaul connections. A first backhaul connection is via an LTE UE to LTE eNodeB/macro 607. Optionally this LTE backhaul connection can be via eNodeB 612. eNodeBs 607 and 612 are shown connecting to SGW 608 and 609, which are core network nodes for the macro base station. PGW 609 provides a gateway to another network where an HNG 610 resides, with an IP 172.168.2.4 at the relevant network interface. A second backhaul connection is via a Wi-Fi mesh connection to multi-RAT node 606, which is on a wired backhaul connection and has a separate connection to HNG 610, with an IP 172.168.2.3 at the relevant network interface. An Internet 611 is connected on the other side of the HNG 610. The HNG 610 is also known as a coordinating gateway throughout this disclosure. 603 is an explanatory note, stating that ESP-UDP IPsec Tunnel, Src IP natted to 192.168.1.1, so that P-GW does not drop the packet (carrying internal traffic from 10.1.1.1).

Multiple tunnels are shown. Firstly, a standard GTP-U tunnel 601 exists between macro eNB 607 and PGW 609, carrying payload data over this tunnel. This payload data includes data received over the LTE backhaul link from base station 605. Secondly, an IPsec tunnel 602 between base station 605, with source IP 172.168.2.2, and HNG 610, with target address 172.168.2.4, is shown. The data for this tunnel is carried as a payload over tunnel 601, enabling secure communications between base station 605 and HNG 610 over the operator core network of eNB 607. Thirdly, an IPsec tunnel 613 is shown between base station 605 and HNG 610 over wired backhaul and mesh base station 606, carrying data from BS 605 to HNG 610 over another secure tunnel for the second backhaul connection.

The second tunnel has its source IP natted to 192.168.1.1, here shown as the address assigned to base station 605 by PGW 609. All payload traffic from UE is thus indicated to core network nodes 608, 609 as coming from an IP address assigned by PGW 609. By performing network address translation (NAT; "natting"; "natted") in this way, LTE backhaul 605 is able to be handed over from macro base station 607 to base station 612, for example, without dropping data during the handover.

In some embodiments, mobility for connected user devices is enabled as follows. In a system according to the present disclosure, an in-vehicle access network is connected via at least two wireless backhaul connections, one being a low-bandwidth wireless backhaul connection and the other being a high-bandwidth, high-quality wireless backhaul connection. The high-bandwidth wireless backhaul is connected to a fixed backhaul connection.

UEs or other mobile devices are connected to the in-vehicle access network. The in-vehicle access network establishes a connection to the mobility anchor for the UE or mobile device, such as a PGW in an LTE network. This connection can be transparently multi-homed using the tunneling architecture described herein, such that the PGW is enabled to connect via the high-bandwidth backhaul when available, and via the low-bandwidth backhaul otherwise.

In some embodiments, handover within the in-vehicle access network is transparently handled by the in-vehicle access network or the coordinating node without generating messaging to the mobility anchor; this enables users to move around within, e.g., the train even in areas of poor backhaul connectivity. In some embodiments, handovers between the in-vehicle access network and an access network with fixed backhaul, e.g., an access network in a train station, are also transparently handled without generating messaging to the mobility anchor. Transparent handling of mobility is enabled by performing handover message proxying and suppression at the coordinating node toward both the radio access network and the mobility anchor, as described in U.S. Pat. No. 9,491,801, hereby incorporated by reference in its entirety for all purposes; for purposes of the mobility anchor, the UE or other mobile device is located at a virtualized base station as represented by the coordinating node toward the mobility anchor.

Advantages of this handover architecture include the following. Users are enabled to move around within, e.g., the train even in areas of poor backhaul connectivity. When a train stops at a station and many users exit a train, the UEs need not generate a handover request toward the mobility anchor in the core network, as the UEs are transparently handed over to the train station access network, and subsequent handovers from the train station access network are more likely to succeed given the high-capacity fixed backhaul at the train station.

A variety of scenarios will now be described: backhaul startup; backhaul handin; backhaul handout; backhaul handover to mesh; UE handin; and UE handout, in accordance with some embodiments.

Backhaul startup is effected as follows. Base station 605, which can be located on the train in some embodiments, contains a UE module. Base station 605 activates the UE module to connect to an existing macro base station, here shown as eNB 607. eNB 607 may be part of any wireless operator network. Alternately, BS 605 may search for or identify particular wireless operator networks based on prioritization or configuration. When BS 605 connects to eNB 607, BS 605's UE module obtains an IP address, here shown as 192.168.1.1, from PGW 609. BS 605 then initiates a connection to HNG 610 via the operator network.

Backhaul handin is effected as follows. Suppose base station 605 has existing backhaul. When BS 605's UE module hands over to another eNB, shown as 612, since BS 605 has the same IP address from PGW 609, all existing connections and tunnels do not need to be modified. Backhaul handout is effected as follows. When base station 605's UE module identifies eNB 612 as having superior signal characteristics, and hands over to eNB 612, since BS 605 has the same IP address from PGW 609, all existing connections and tunnels do not need to be modified.

Backhaul handover to mesh is effected as follows. The Wi-Fi mesh network toward base station 606 is independent of the LTE UE module. BS 606's connection may be established via Wi-Fi when the connection is available, and the mesh connection may be marked as available at BS 605. When BS 605 determines that the mesh network has become available, BS 605 may immediately switch from sending payload data over tunnel 602 to sending payload data over tunnel 613. It is noted that mesh node 606 is representative of access to any mesh network with any number of mesh egress nodes.

UE handin and handout is effectuated as follows. Handin of UE 604 involves attaching to BS 605. When handed in, the UE attempts to connect to its own core network, as configured by its IMSI. However, the UE must traverse one of the backhaul connections to do so. The backhaul connection is selected by base station 605. UE 604 sends its data as payload data over either tunnel 602 or tunnel 613. UE 604's attach request passes through a tunnel to HNG 610, then to Internet 611, then to a PGW (either PGW 609 or another PGW, not shown). The handover is then completed via the PGW. UE handout occurs by the UE handing over to another base station, such as eNB 607 directly, in which case it will use PGW 609 as its new PGW.

Figure 7:
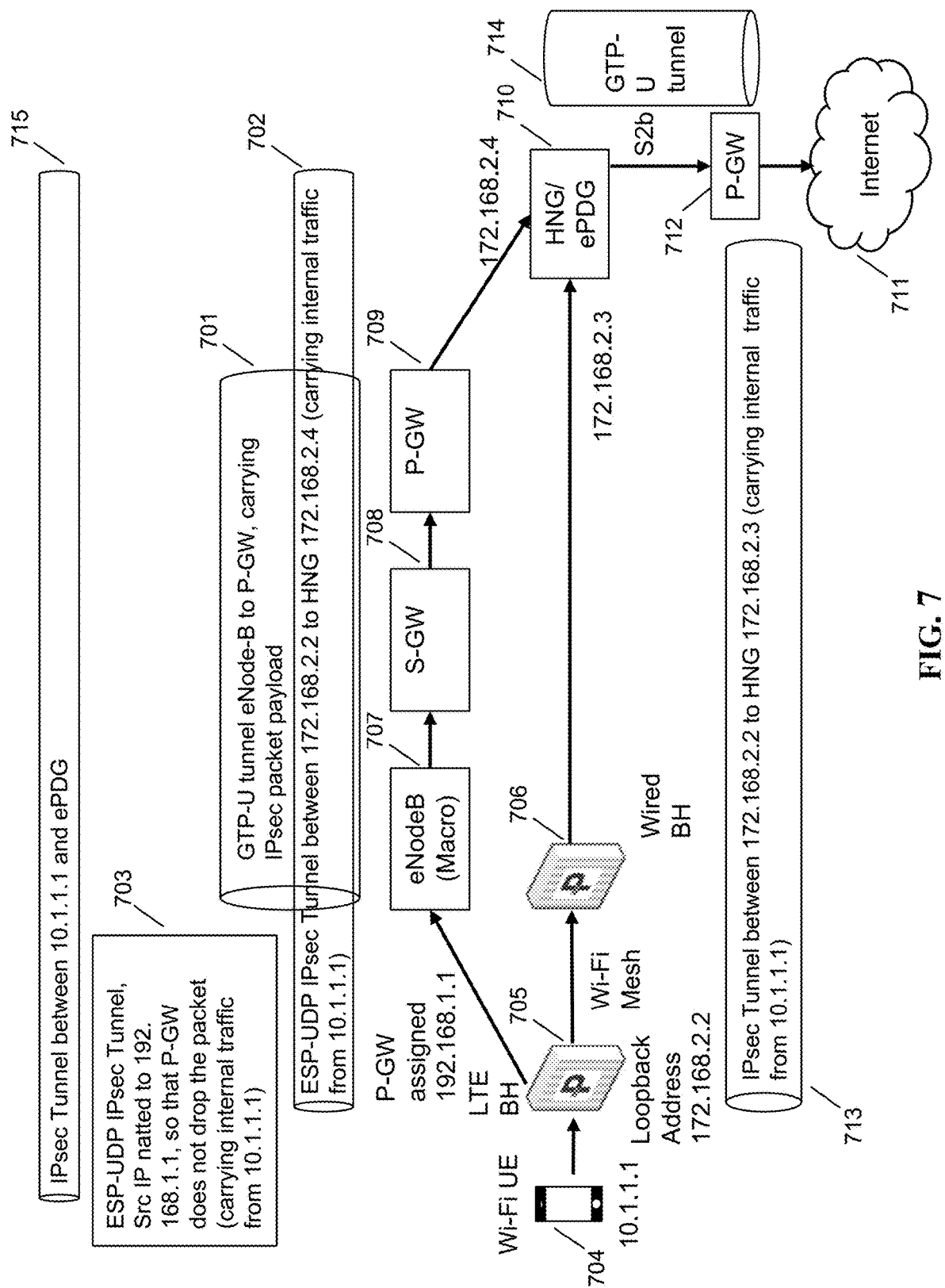
FIG. 7 is a schematic diagram of a wireless network showing tunneling and network address translation for a further mobile device, in accordance with some embodiments.

FIG. 7 is a schematic diagram of a wireless network showing tunneling and network address translation for a further mobile device, in accordance with some embodiments. A Wi-Fi UE 704, multi-RAT base station 705, wired backhaul mesh node 706, HNG/ePDG 710, P-GW 712, and Internet 711 are shown. Tunnels include GTP-U tunnel 701, IPsec tunnel 702, IPsec tunnel 715, IPsec tunnel 713, and GTP-U tunnel 714. 703 is an explanatory note, stating that ESP-UDP IPsec Tunnel, Src IP natted to 192.168.1.1, so that P-GW does not drop the packet (carrying internal traffic from 10.1.1.1).

In addition to the network nodes shown and described above with reference to FIG. 6, the UE 704 is a Wi-Fi UE, and connects via an ePDG. The ePDG is colocated at the HNG 710. A Wi-Fi UE is authenticated by an ePDG prior to accessing a core network (here, PGW 712). Data transmitted by Wi-FI UE 704 is first sent over a fourth tunnel, an IPsec tunnel between the Wi-Fi UE directly and the ePDG. The fourth tunnel travels as payload data over either the second tunnel (which is nested within the first tunnel) or the third tunnel. Once the tunneled data emerges at the ePDG, another GTP-U tunnel, unsecured, 714 is used to forward the data to PGW 712 and from there to the Internet.

With respect to the normal ePDG call flow, described in the ePDG manual "ePDG Administration Guide, StarOS Release 20," hereby incorporated by reference in its entirety, typically, after successful authentication of the Wi-Fi mobile device, an IP address is assigned to the mobile station from the PGW. However, to enable improved handover for the UE between LTE and Wi-Fi backhaul, the following modification is made. Once the PGW receives the Create Session Request from the ePDG, given that the request contains UE's IMSI info, the PGW will check whether IP address has already been assigned to this UE or not (in case this UE was served by the LTE before handing-in to the WIFI coverage). If there was no IP address assigned, PGW assigns one new IP address. If IP address has been assigned, the same IP address will be assigned by the PGW to this UE. In this way, the UE can preserve the same IP address in between the LTE and Wi-Fi HO process, hence achieving the seamless experience.

In some embodiments, Wi-Fi handin and handout are performed as follows. When handing in a Wi-Fi UE, such as UE 704, an existing ePDG tunnel 715 between UE 704 and ePDG 710 is presumed to exist. Because connectivity is available via either tunnel 702 or tunnel 713 to deliver the tunnel payload, no break in the tunnel occurs and handin occurs without disruption. In some embodiments, IMSI could be provided on authorization of the UE at the ePDG. By providing the IMSI to the ePDG, the ePDG, or the PGW handling the handin request, it can be determined whether backhaul tunnel 702 or backhaul tunnel 713 is being used to backhaul the tunnel 715, and the PGW or ePDG can determine whether it should preserve the IP address currently assigned to the Wi-Fi UE 704.

In some embodiments, NAT traversal could be used according to the IPsec specification.

In some embodiments the PGW located on the other side of the HNG could be the same PGW shown as 709.

Figure 8:
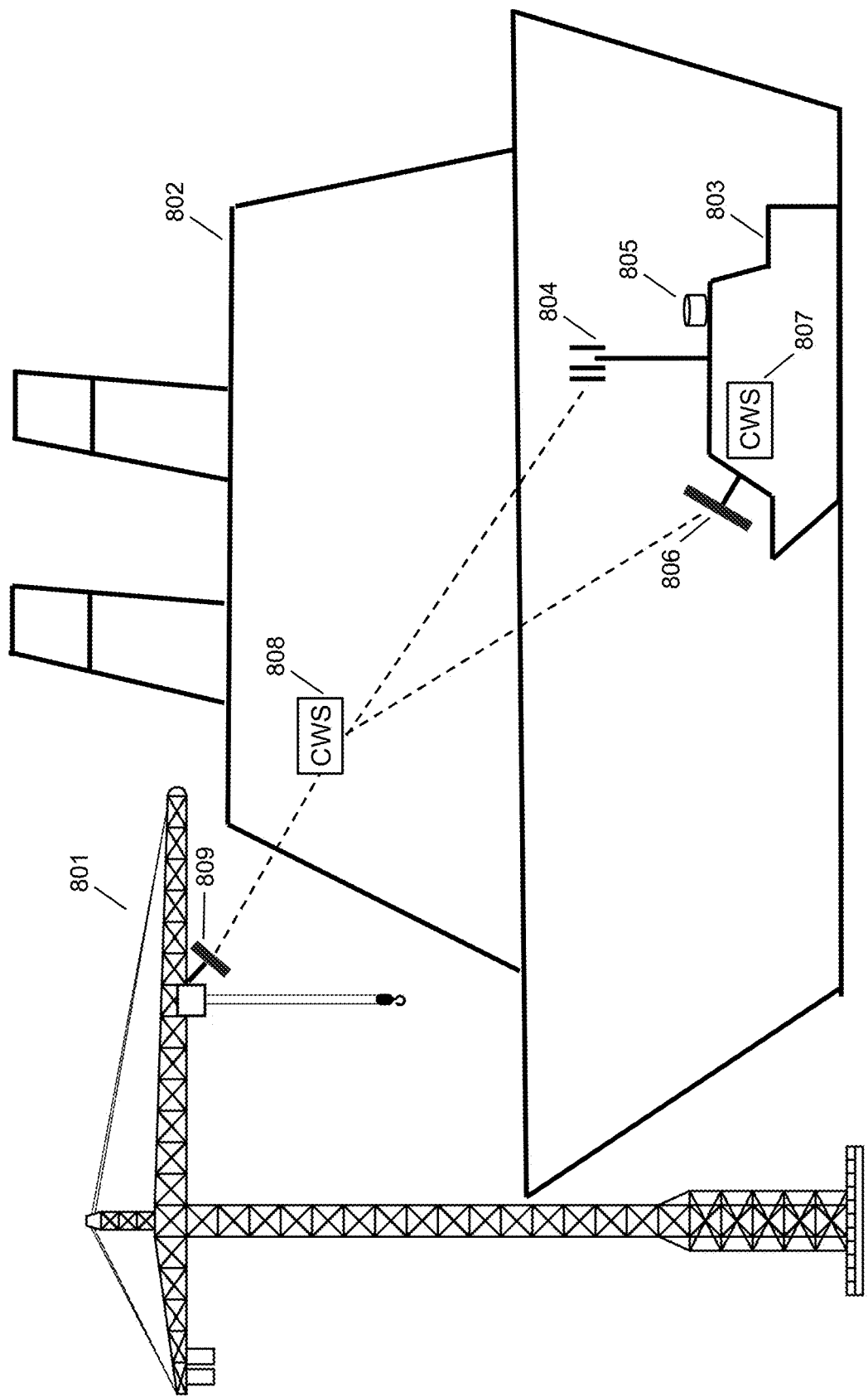
FIG. 8 is a schematic diagram of a wireless network showing antennas and signal coverage in a maritime environment, in accordance with some embodiments.

FIG. 8 is a schematic diagram of a wireless network showing antennas and signal coverage in a maritime environment, in accordance with some embodiments. In maritime environments, an embodiment similar to the above embodiments described in relation to trains could be used. Large oceangoing vessel 802 is shown, along with crane 801 and small oceangoing vessel 803. Vessel 802 may be a cruise ship, a tanker ship, a container ship, or another such vessel. Vessel 803 may be a tugboat, motorboat, yacht, or other such vessel. Crane 801 is intended to represent any and all land-based maritime vessel maintenance facilities. Crane 801 includes a wireless network access antenna 809, connected to a base station (not shown) and to a wired backhaul link. Vessel 802 may have a multi-radio access technology (multi-RAT), flexible backhaul base station, shown as CWS 808, coupled to radio access network antennas (not shown)

and/or satellite backhaul antennas (not shown). Vessel 803 may have one or more radio access network antennas, including directional patch antenna 806, omnidirectional antenna 805, and sectorized cellular antennas 804, and at least one access point/base station 807, for providing access to users on board vessel 803. Vessel 803 may also be configured to provide relay access to vessel 802, as a relay node or by creating a mesh network with vessel 802. Sectorized antennas 804 may be provided to increase coverage to users on board vessel 803, such as, for example, passengers on a cruise ship attaching to LTE networks via sectorized antennas 804.

In some embodiments the network aboard vessel 802 may be treated analogous to the train network described previously. When vessel 802 enters into proximity of vessel 803 it may be able to connect to a network generated by vessel 803. The network of vessel 803 may provide access to the network of harbor facility 801. Alternately, when vessel 802 enters into a harbor area, it may connect to the network of harbor facility 801. Base stations at vessel 803 and facility 801 may be used to provide LTE backhaul or mesh backhaul to vessel 802. Vessel 802 may treat its low-bandwidth satellite backhaul as a first backhaul connection, and the LTE backhaul/mesh backhaul provided via facility 801 or vessel 803 as a second backhaul connection with greater bandwidth. Further embodiments are as described herein.

To provide high speed access for the users on the ships, big ships comes near port (generally around 10 kms from port) for refueling, while small boats carry the fuel to the ships away from port for re-fueling. Small ships can be equipped with the Parallel Wireless CWS solution which will provide Cellular or WiFi Access for users on the ships. Directional or Omni antennas can be used to direct the access signal, with backhaul being any cellular technology, LTE, or 3G. With access on the ships along with communication links, security, monitoring and other value added services can be provided to the users.

Given that the serving targets in this context are largely foreign boats, in-ship cellular access can be turned on to capture roaming revenue. The choice of cellular access scheme (3G or 4G, spectrum range) will be dynamically determined to minimize the interference from the surrounding environment. To mitigate the self-interference, the choice of cellular for backhaul will be different from that used for the access either technology wise (3G vs. 4G) or spectrum-band wise. To conform to government regulation, geofencing needs to be applied, i.e., certain cellular access can be turned on only matching certain permitted geographic coordinates.

Other Value Added Services can be provided: Real time monitoring, Alerts, Communications; Communication and high speed internet access in ships; Live monitoring from central data center via IP cameras; Data/Statistics can be updated real time such as gallons, amount of fuel; Emergency services can be called real time by sending/generating alert signal; and Entertainment by local content caching and high speed internet access. Content Caching & Pre-loading could be used, as well as providing seamless cellular<->WIFI Handover, Higher QCI and Optimized Handover parameters.

Seamless cellular<->WIFI handover would be ideal to provide good quality of UE experience boarding the ship. Backhaul plays a very important role, QOE/QOS inside the ship directly depends upon the Backhaul throughput achieved. Prior Drive test might be required to study current signal level and quality along the track which will be available as Backhaul. Loading of parent Base station/ eNodeB plays a very critical role for amount of throughput available for backhaul. Higher QCI for CWS backhaul modem is very critical. Higher QCI can be allocated for voice traffic. Handover parameters shall be tuned/optimized thus Backhaul UE handovers between Macro base stations are perfectly synchronized along the shore line.

As shown, a high gain antenna towards CWS can be mounted on a ship. CWS will be installed on the refueling boat. Cellular base station's RF coverage will act as Backhaul for the CWS installed on the re-fueling boat. Additional coverage tests needs to be conducted as RF signal propagation/reflection is different in water than usual land case. If the coverage towards sea is not available PW CWS with boosters can be installed on the sea shores. Backhaul Antenna will be installed such that it does not face shadowing and always be connected to cellular backhaul. Access antenna can be directional or Omni directional and can be installed according to the requirements. With multiple directional antennas more coverage and area/ships can be covered. The access antennas installed on CWS will direct Wi-Fi/Cellular signal towards Big ship while refueling. Directional antennas can be used for the signal transmission.

CWS can also be mounted on the cranes and antennas can be directed towards ships in dockyard. Live monitoring and surveillance can be conducted by using cameras. CWS can also be installed or additional directional antennas can be installed in dockyard area to provide access coverage.

Figure 9:
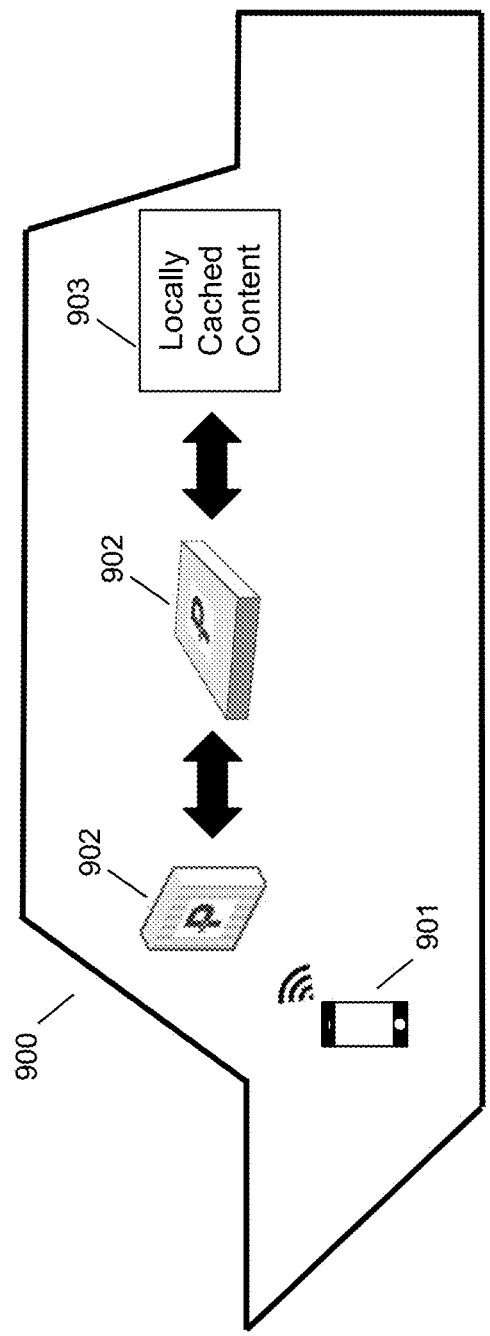
FIG. 9 is a further schematic diagram of a wireless network showing antennas and signal coverage in a maritime environment, in accordance with some embodiments.

FIG. 9 is a further schematic diagram of a wireless network showing antennas and signal coverage in a maritime environment, in accordance with some embodiments. On board vessel 900 are base station 902, providing access to mobile device 901, which may be an LTE UE or a Wi-Fi mobile device; coordinating node 902; and local content caching server 903. Together these elements may enable mobile device 901 to have access to a subset of services and content when no or limited connectivity is available, while when base station 902 enters into range of a reliable or high-bandwidth backhaul connection, it may provide high network throughput to mobile device 901.

Figure 10:
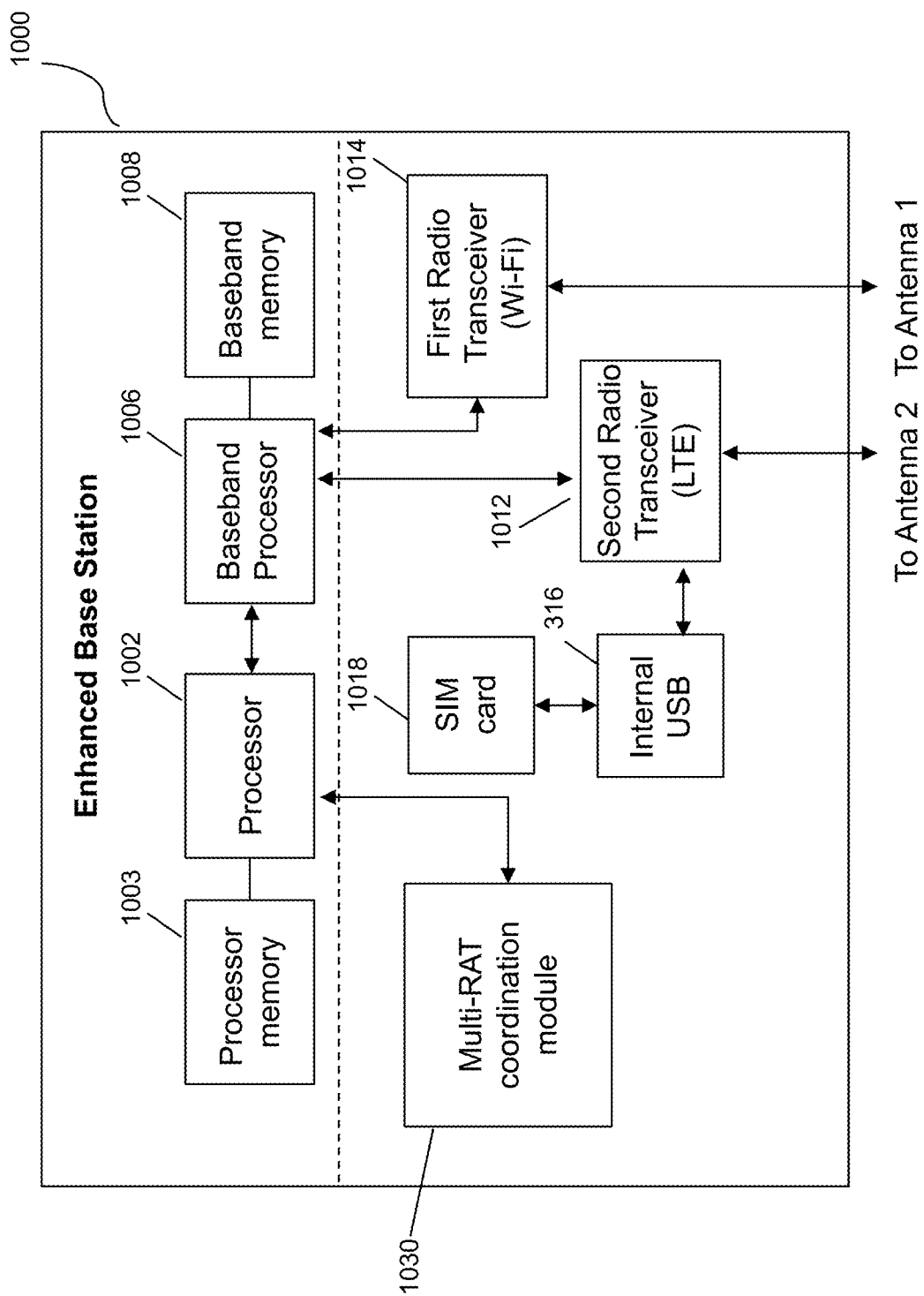
FIG. 10 is a schematic diagram of an enhanced base station, in accordance with some embodiments.

FIG. 10 is a schematic diagram of an enhanced base station, in accordance with some embodiments. Enhanced base station 1000, described herein as a multi-RAT node or a CWS, may be an eNodeB for use with LTE, and may include processor 1002, processor memory 1004 in communication with the processor, baseband processor 1006, and baseband processor memory 1008 in communication with the baseband processor. Enhanced eNodeB 1000 may also include first radio transceiver 1014, which is a Wi-Fi transceiver, and second radio transceiver 1012, which is an LTE transceiver; enhanced eNodeB 1000 is thus a multi-radio access technology (multi-RAT) node. Enhanced eNodeB 1000 may also include internal universal serial bus (USB) port 1016, and subscriber information module card (SIM card) 1018 coupled to USB port 1016. In some embodiments, the second radio transceiver 1012 itself may be coupled to USB port 1016, and communications from the baseband processor may be passed through USB port 1016. Transceiver 1014 is connected to Antenna 1, which provides Wi-Fi antenna functionality, and transceiver 1012 is connected to Antenna 2, which provides LTE transmit and receive antenna functionality. Wi-Fi radio transceiver 1014 may provide, e.g., IEEE 802.11a/b/g/n/ac functionality or other Wi-Fi functionality. In some embodiments, Wi-Fi transceiver and Antenna 1 may provide multiple-in, multiple-out (MIMO) functionality. LTE transceiver 1012 may be a user equipment (UE) modem. In other embodiments, a UE modem may be connected via a USB bus.

Processor 1002 and baseband processor 1006 are in communication with one another. Processor 1002 may perform routing functions, and may determine if/when a switch in network configuration is needed. Baseband processor 1006 may generate and receive radio signals for both radio transceivers 1012 and 1014, based on instructions from processor 1002. In some embodiments, processors 1002 and 1006 may be on the same physical logic board. In other embodiments, they may be on separate logic boards.

Either transceiver may be coupled to processor 1002 via a Peripheral Component Interconnect-Express (PCI-E) bus, and/or via a daughtercard. As transceiver 1012 is for providing LTE UE functionality, in effect emulating a user equipment, it may be connected via the same or different PCI-E bus, or by a USB bus, and may also be coupled to SIM card 1018.

SIM card 1018 may provide information required for authenticating the simulated UE to the evolved packet core (EPC). When no access to an operator EPC is available, local EPC 1020 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1000 is not an ordinary UE but instead is a special UE for providing backhaul to device 1000.

In some embodiments, wireless radio coverage (i.e., access) to user devices may be provided via Wi-Fi radio transceiver 1014. In some embodiments, an additional radio transceiver capable of providing LTE eNodeB functionality (not shown) may be provided, and may be capable of higher power and multi-channel OFDMA for providing access. Processor 1002 may be configured to provide eNodeB, nodeB, BTS, base station, access point, and/or other functionality.

Wireless backhaul or wired backhaul may be used. Wired backhaul may be an Ethernet-based backhaul (including Gigabit Ethernet), or a fiber-optic backhaul connection, or a cable-based backhaul connection, in some embodiments. Wireless backhaul may be provided using an LTE connection, using LTE UE modem 1012. Additionally, wireless backhaul may be provided in addition to wireless transceivers 1010 and 1012, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1002 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included. The SON module may be configured to provide transmit power increase/decrease functionality, radio band switching functionality, or communications with another remote SON module providing, for example, these types of functionality, in some embodiments. The SON module may execute on the general purpose processor 1002.

Processor 1002 may identify the appropriate network configuration, and may perform routing of packets from one network interface to another accordingly. Processor 1002 may use memory 1004, in particular to store a routing table to be used for routing packets. Baseband processor 1006 may perform operations to generate the radio frequency signals for transmission or retransmission by both transceivers 1010 and 1012. Baseband processor 1006 may also perform operations to decode signals received by transceivers 1010 and 1012. Baseband processor 1006 may use memory 1008 to perform these tasks.

Figure 11:
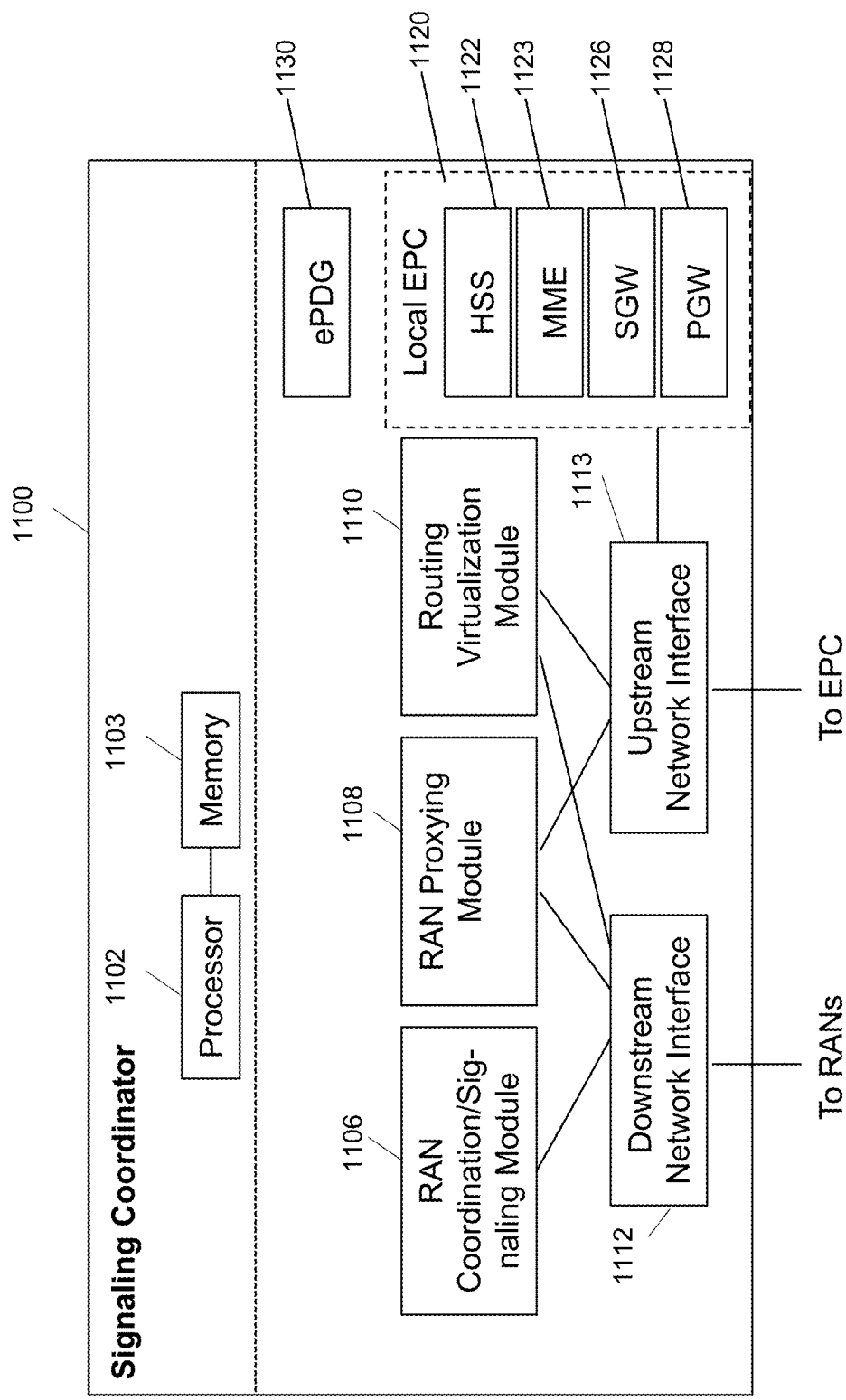
FIG. 11 is a schematic diagram of a signaling coordinator server, in accordance with some embodiments.

FIG. 11 is a schematic diagram of a signaling coordinator server, in accordance with some embodiments. Signaling coordinator 1100, referred to herein as an HNG, includes processor 1102 and memory 1104, which are configured to provide the functions described herein. Also present are radio access network coordination/signaling (RAN Coordination and signaling) module 1106, RAN proxying module 1108, and routing virtualization module 1110. In some embodiments, coordinator server 1100 may coordinate multiple RANs using coordination module 1106. In some embodiments, coordination server may also provide proxying, routing virtualization and RAN virtualization, via modules 1110 and 1108. In some embodiments, a downstream network interface 1112 is provided for interfacing with the RANs, which may be a radio interface (e.g., LTE), and an upstream network interface 1114 is provided for interfacing with the core network, which may be either a radio interface (e.g., LTE) or a wired interface (e.g., Ethernet). Signaling storm reduction functions may be performed in module 1106.

Signaling coordinator 1100 includes local evolved packet core (EPC) module 1120, for authenticating users, storing and caching priority profile information, and performing other EPC-dependent functions when no backhaul link is available. Local EPC 1120 may include local HSS 1122, local MME 1124, local SGW 1126, and local PGW 1128, as well as other modules. Local EPC 1120 may incorporate these modules as software modules, processes, or containers. Local EPC 1120 may alternatively incorporate these modules as a small number of monolithic software processes. Modules 1106, 1108, 1110 and local EPC 1120 may each run on processor 1102 or on another processor, or may be located within another device. An ePDG 1130 is also present.

Signaling coordinator 1100 may be a pass-through gateway for data tunnels, forwarding data through to a core network. Signaling coordinator 1100 may also provide encryption functions, e.g., using IPsec for encrypting or decrypting data for forwarding over one or more bearers to the core network. In the case that Wi-Fi is used at one or more base stations to provide access to user devices, the signaling coordinator may be a trusted wireless access gateway (TWAG) or evolved packet data gateway (ePDG), providing the ability for the Wi-Fi user devices to participate in and join the operator network. In some cases, signaling coordinator 1100 may be a home eNodeB gateway (HENBGW). Because the built-in QCI and TOS mechanisms used by the methods described herein are passed through by IPsec, GTP-U, and other tunneling protocols, these quality of service (QOS) parameters are preserved by the signaling coordinator 1100.

Figure 12:
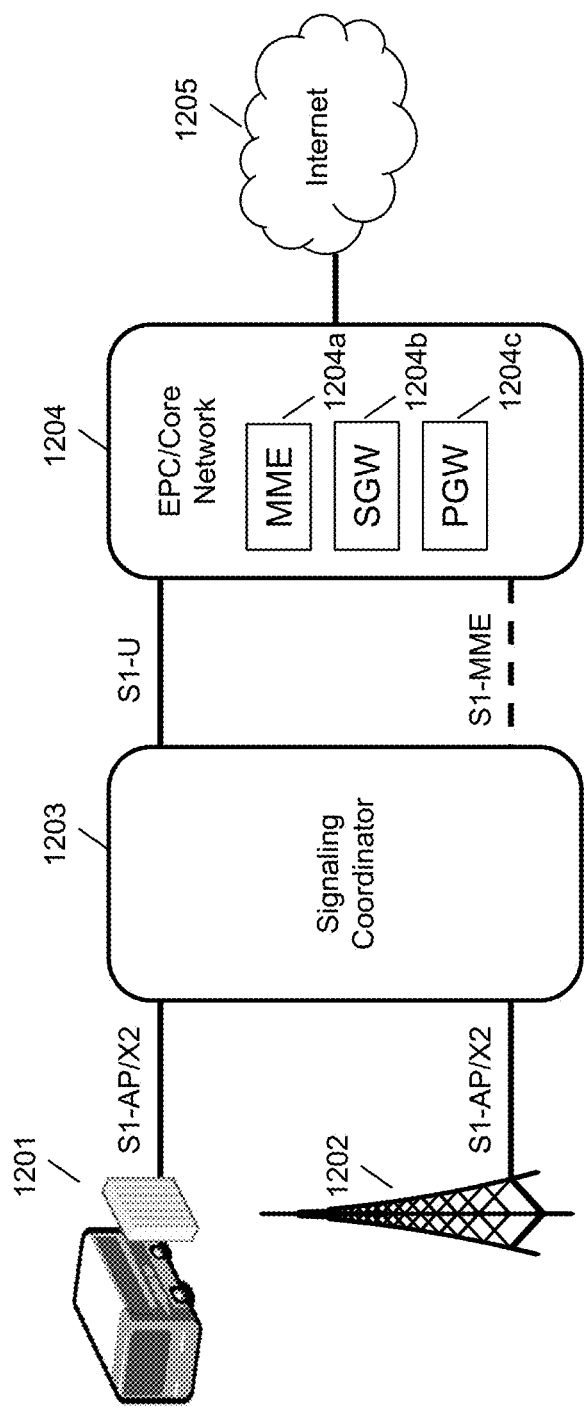
FIG. 12 is a system architecture diagram of an exemplary network configuration, in accordance with some embodiments.

FIG. 12 is a system architecture diagram of an exemplary network configuration, in accordance with some embodiments, showing the signaling coordinator or HNG in its relationship as a gateway between the radio access network and the core network. Base stations 1201 and 1202 are connected via an S1-AP and an X2 interface to signaling coordinator 1203. Base stations 1201 and 1202 are eNodeBs, in some embodiments. Base station 1201 is a mobile base station located on a bus, and is connected via wireless LTE backhaul. Base station 1202 is a fixed base station connected via wired backhaul. Signaling coordinator 1203, which may be the same as described earlier in FIG. 11 as signaling coordinator 1100, is connected to the evolved packet core (EPC)/Core Network 1208 via an S1 protocol connection and an S1-MME protocol connection. Coordination of base stations 1202 and 1204 may be performed at the coordination server. In some embodiments, the coordination server may be located within the EPC/Core Network 1208. EPC/Core Network 1208 provides various LTE core network functions, such as authentication, data routing, charging, and other functions, and includes mobility management entity (MME) 1204*a*, serving gateway (SGW) 1204*b*, and packet data network gateway (PGW) 1204*c*. In some embodiments, mobility management is performed both by coordination server 1206 and within the EPC/Core Network 1208. EPC/Core Network 1208 provides, typically through PGW 1204*c*, a connection to the public Internet 1210.

In operation, data is received at, e.g., a Wi-Fi access point that is part of base station 1201, which is a multi-RAT base station. The data is assigned a TOS and an LTE bearer, and the data is sent via signaling coordinator 1203 to core network 1204. The data is encapsulated in a bearer at base station 1201 and un-encapsulated from the bearer at the core network 1204, and experiences quality of service prioritization within the network. If the data is forwarded on from the core network to the Internet 1205, TOS is preserved.

While a signaling coordinator 1203 is shown in this embodiment, the described method may be used without a signaling coordinator, e.g., in a standard LTE core network where eNodeBs are connected directly to an operator core network. Alternatively, in some embodiments, the functions and steps described herein may be split among the eNodeB/multi-RAT node 1201 and signaling coordinator 1203, so that the Wi-Fi SSID may be assigned to a TOS at base station 1201 or at a Wi-Fi femto cell, but not used for QoS until reaching a coordinating node 1203.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 10G/2G, legacy TDD, or other air interfaces used for mobile telephony. In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the Wi-Fi frequency bands described herein may be channels determined by the respective IEEE 802.11 protocols, which are incorporated herein to the maximum extent permitted by law. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

Those skilled in the art will recognize that multiple hardware and software configurations may be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention may be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment. Those of skill in the art will recognize that small cells, macro cells, wireless access points, femto gateways, etc. may all benefit from the methods described herein.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods may be combined. In the scenarios where multiple embodiments are described, the methods may be combined in sequential order, in various orders as necessary.

Although certain of the above systems and methods for providing interference mitigation are described in reference to the Long Term Evolution (LTE) standard, one of skill in the art would understand that these systems and methods may be adapted for use with other wireless standards or versions thereof.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A system for providing wireless access, comprising:
a base station for providing access to mobile devices, the base station connected to an operator core network via a first and a second wireless backhaul connection, wherein the first wireless backhaul connection is a lower-bandwidth wireless backhaul connection and the second wireless backhaul connection is a higher-bandwidth wireless backhaul connection; and
a coordinating node coupled to the base station via the first and the second wireless backhaul connection;
wherein mobile device data packets are double encapsulated into a first data tunnel and a second data tunnel to be sent over the first wireless backhaul connection, and
wherein a source network address of the first data tunnel is translated at the base station to an address assigned to the base station by a first anchor node in a network of the first wireless backhaul connection,
thereby enabling mobile device handover between the first wireless backhaul connection and the second wireless backhaul connection.

2. The system of claim 1, further comprising an ePDG located at the coordinating node, a Wi-Fi UE, and an additional IPsec tunnel between the Wi-Fi UE and the ePDG.

3. The system of claim 1, wherein the endpoints of the first data tunnel are the base station and the first anchor node, and the endpoints of the second data tunnel are the base station and the coordinating node.

4. The system of claim 1, wherein mobile device data packets are encapsulated into a third data tunnel to be sent over the second wireless backhaul connection, and where the endpoints of the third data tunnel are the base station and the coordinating node.

5. The system of claim 1, wherein the source network address of the first data tunnel is translated to a network address of the base station assigned by the first anchor node of the base station for the lower-bandwidth wireless backhaul connection.

6. The system of claim 1, wherein at least one mobile device of the mobile devices is a UE, and wherein the UE is anchored to a second mobility anchor node, the second mobility anchor node being a packet data network gateway (PGW), the second mobility anchor node being accessed via the coordinating node as a gateway.

7. The system of claim 6, wherein the second mobility anchor node is the first anchor node.

8. The system of claim 1, wherein the base station is configured to permit handover of the first wireless backhaul connection from a first eNB to a second eNB.

9. The system of claim 1, wherein the base station is configured to permit handover from the first wireless backhaul connection to the second wireless backhaul connection.

10. The system of claim 1, wherein the lower-bandwidth wireless backhaul connection is an LTE UE connection via an LTE macro eNodeB to an LTE core network, and wherein the base station is assigned an IP address via a packet data network gateway (PGW) acting as a mobility anchor node in the LTE core network, and wherein the source network address of the first data tunnel is translated to the PGW-assigned base station IP address.

11. The system of claim 1, wherein the first and the second data tunnels are an ESP-UDP IPsec tunnel and a GTP-U tunnel.

12. The system of claim 1, wherein the second wireless backhaul connection is via a base station with Ethernet or fiber wired backhaul.

13. The system of claim 1, further comprising a plurality of base stations configured to provide Wi-Fi access on a plurality of channels.

14. The system of claim 1, wherein the coordinating node is configured to check IMSI of mobile device to determine whether an IP address should be preserved, and configuring the base station for encapsulation.

15. The system of claim 1, wherein the base station is configured to use the second wireless backhaul connection when within range, the second wireless backhaul connection providing access from a location in a train station.

16. The system of claim 1, wherein multiple Wi-Fi access points are mounted within a plurality of train cars, wherein the multiple Wi-Fi access points are configured to form a single mesh network, and wherein the multiple Wi-Fi access points are configured to share access to the second wireless backhaul connection when one or more of the Wi-Fi access points are within range of the second wireless backhaul connection.

17. The system of claim 1, wherein the base station is configured to permit handin and handout of Wi-Fi devices to and from other Wi-Fi networks via an evolved packet data gateway (ePDG) functionality at the coordinating node.

18. The system of claim 1, wherein the base station is configured to permit handin and handout of LTE UE devices to and from other cells.

* * * * *